US011877351B2

(12) United States Patent
Yang et al.

(10) Patent No.: US 11,877,351 B2
(45) Date of Patent: *Jan. 16, 2024

(54) PROVISION GPSI PERTAINING TO PDU SESSION(S)

(71) Applicant: Telefonaktiebolaget LM Ericsson (publ), Stockholm (SE)

(72) Inventors: Yong Yang, Kållered (SE); Yunjie Lu, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/946,576

(22) Filed: Sep. 16, 2022

(65) Prior Publication Data

US 2023/0074415 A1 Mar. 9, 2023

Related U.S. Application Data

(63) Continuation of application No. 17/607,752, filed as application No. PCT/EP2020/061382 on Apr. 23, 2020, now Pat. No. 11,496,889.

(Continued)

(51) Int. Cl.
*H04W 76/16* (2018.01)
*H04W 8/26* (2009.01)
(Continued)

(52) U.S. Cl.
CPC ............. *H04W 8/26* (2013.01); *H04W 8/183* (2013.01); *H04W 8/20* (2013.01)

(58) Field of Classification Search
None
See application file for complete search history.

(56) References Cited

U.S. PATENT DOCUMENTS 11,496,889 B2 * 11/2022 Yang .................... H04W 48/14
2015/0103739 A1 4/2015 Ni et al.
(Continued)

FOREIGN PATENT DOCUMENTS

KR 20180106998 A 10/2018
RU 2371873 C2 10/2009
(Continued)

OTHER PUBLICATIONS

Author Unknown, "Technical Specification Group Core Network and Terminals; Numbering, addressing and identification (Release 15)," Technical Specification 23.003, Version 15.6.0, Dec. 2018, 3GPP Organizational Partners, 130 pages.

(Continued)

*Primary Examiner* — Gary Lafontant
(74) *Attorney, Agent, or Firm* — Withrow & Terranova, PLLC

(57) ABSTRACT

Disclosed herein is a method by an AMF node 120-4 operative in a 5GS that comprises a UE 112 associated with a Subscriber Permanent Identifier (SUPI) that is associated with subscription data of the UE. The method comprises: sending towards a SMF node, a request relating to a PDU Session of the UE and comprising a Request Type that is set to Existing PDU Session; and receiving from the SMF node, a response comprising a Generic Public Subscription Identifier (GPSI) of the PDU session, which GPSI is associated with the SUPI and which GPSI is to be used in networks outside the 5GS for addressing the subscription data of the UE.

12 Claims, 8 Drawing Sheets

Related U.S. Application Data

(60) Provisional application No. 62/842,309, filed on May 2, 2019.

(51) Int. Cl.
*H04W 8/18* (2009.01)
*H04W 8/20* (2009.01)

(56) References Cited

U.S. PATENT DOCUMENTS

| | | |
|---|---|---|
| 2017/0111219 A1 | 4/2017 | Saltsidis |
| 2017/0289046 A1 | 10/2017 | Faccin et al. |
| 2019/0007500 A1 | 1/2019 | Kim et al. |

FOREIGN PATENT DOCUMENTS

| | | |
|---|---|---|
| WO | 2019032972 A1 | 2/2019 |
| WO | 2019223466 A1 | 11/2019 |
| WO | 2020068521 A1 | 4/2020 |

OTHER PUBLICATIONS

Author Unknown, "Technical Specification Group Services and System Aspects; System Architecture for the 5G System, Stage 2 (Release 15)," Technical Specification 23.501, Version 15.5.0, Mar. 2019, 3GPP Organizational Partners, 241 pages.
Author Unknown, "Technical Specification Group Services and System Aspects; System Architecture for the 5G System, Stage 2 (Release 16)," Technical Specification 23.501, Version 16.0.2, Apr. 2019, 3GPP Organizational Partners, 317 pages.
Author Unknown, "Technical Specification Group Services and System Aspects; Procedures for the 5G System; Stage 2 (Release 15)," Technical Specification 23.502, Version 15.5.0, Mar. 2019, 3GPP Organizational Partners, 355 pages.
Author Unknown, "Technical Specification Group Core Network and Terminals; 5G System; Restoration Procedures (Release 15)," Technical Specification 23.527, Version 15.2.0, Mar. 2019, 3GPP Organizational Partners, 19 pages.
Author Unknown, "Technical Specification Group Core Network and Terminals; Non-Access-Stratum (NAS) protocol for 5G System (5GS); Stage 3 (Release 16)," Technical Specification 24.501, Version 16.0.2, Mar. 2019, 3GPP Organizational Partners, 480 pages.
Author Unknown, "Technical Specification Group Core Network and Terminals; 5G System; Technical Realization of Service Based Architecture; Stage 3 (Release 15)," Technical Specification 29.500, Version 15.3.0, Mar. 2019, 3GPP Organizational Partners, 33 pages.
Author Unknown, "Technical Specification Group Core Network and Terminals; 5G System; Session Management Services; Stage 3 (Release 15)," Technical Specification 29.502, Version 15.3.0, Mar. 2019, 3GPP Organizational Partners, 140 pages.
Author Unknown, "Technical Specification Group Core Network and Terminals; 5G System; Unified Data Management Services; Stage 3 (Release 15)," Technical Specification 29.503, Version 15.3.0, Mar. 2019, 3GPP Organizational Partners, 187 pages.
Author Unknown, "Technical Specification Group Core Network and Terminals; 5G System; Common Data Types for Service Based Interfaces; Stage 3 (Release 15)," Technical Specification 29.571, Version 15.3.0, Mar. 2019, 3GPP Organizational Partners, 73 pages.
Author Unknown, "Technical Specification Group Services and System Aspects; Telecommunication management; Charging management; 5G data connectivity domain charging, stage 2 (Release 16)," Technical Specification 32.255, Version 16.0.0, Mar. 2019, 3GPP Organizational Partners, 71 pages.
Author Unknown, "Technical Specification Group Services and System Aspects; Telecommunication management; Subscriber and equipment trace; Trace control and configuration management (Release 15)," Technical Specification 32.422, Version 15.1.0, Jun. 2018, 3GPP Organizational Partners, 189 pages.
Author Unknown, "Technical Specification Group Services and System Aspects; Security; Lawful Interception (LI) architecture and functions (Release 15)," Technical Specification 33.127, Version 15.1.0, Mar. 2019, 3GPP Organizational Partners, 54 pages.
Ericsson, "C4-193237: Item 14—Update reference to stage 2 procedure for I-SMF insertion, change, removal," 3GPP TSG-CT WG4 Meeting #93, Aug. 26-30, 2019, Wroclaw, Poland, 6 pages.
LG Electronics, "S2-181508: Clarification on handover applicability between 3GPP and non-3GPP accesses," 3GPP TSG-SA WG2 Meeting #126, Feb. 26-Mar. 2, 2018, Montreal, Canada, 9 pages.
Nokia, et al., "S2-181704: Selection mode transfer over N11 and N16 (wildcard DNN)," 3GPP SA WG2 Meeting #126, Feb. 26-Mar. 2, 2018, Montreal, Canada, 14 pages.
Extended European Search Report for European Patent Application No. 22166925.2, dated Jun. 29, 2022, 9 pages.
Examination Report for Indian Patent Application No. 202147055398, dated Mar. 30, 2022, 5 pages.
Request for the Submission of an Opinion for Korean Patent Application No. 10-2021-7038561, dated Oct. 19, 2022, 4 pages.
Official Action for Russian Patent Application No. 2021135162, dated May 30, 2022, 17 pages.
International Search Report and Written Opinion for International Patent Application No. PCT/EP2020/061382, dated Jul. 14, 2020, 11 pages.
Non-Final Office Action for U.S. Appl. No. 17/607,752, dated Mar. 15, 2022, 8 pages.
Notice of Allowance for U.S. Appl. No. 17/607,752, dated Jul. 15, 2022, 8 pages.
Ericsson, "C4-192255: Correction on GPSI for PDU session," 3GPP TSG-CT WG4 Meeting #91, Change Request, May 13-17, 2019, Reno, Nevada, 18 pages.
Decision to Grant for Japanese Patent Application No. 2021-564093, dated Jan. 31, 2023, 6 pages.

\* cited by examiner

PROVISION GPSI PERTAINING TO PDU SESSION(S)

This application is a continuation of U.S. patent application Ser. No. 17/607,752, filed Oct. 29, 2021, now U.S. Pat. No. 11,496,889; which is a 35 U.S.C. § 371 national phase filing of International Application No. PCT/EP2020/061382, filed Apr. 23, 2020, which claims the benefit of Provisional Patent Application Ser. No. 62/842,309, filed May 2, 2019, the disclosures of which are hereby incorporated herein by reference in their entireties.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the Third Generation Partnership Project (3GPP) Fifth Generation (5G) core (5GC), a User Equipment (UE) may have multiple General Public Subscription Identifiers (GPSIs) associated to the same Subscription Permanent Identifier (SUPI).

As specified in 3GPP Technical Specification (TS) 23.501 V16.0.2:

---

5.9.8 Generic Public Subscription Identifier

---

Generic Public Subscription Identifier (GPSI) is needed for addressing a 3GPP subscription in different data networks outside of the 3GPP system. The 3GPP system stores within the subscription data the association between the GPSI and the corresponding SUPI.

GPSIs are public identifiers used both inside and outside of the 3GPP system.

The GPSI is either an MSISDN or an External Identifier, see TS 23.003 [19]. If MSISDN is included in the subscription data, it shall be possible that the same MSISDN value is supported in both 5GS and EPS.

---

NOTE:
There is no implied 1-to-1 relationship between GPSI and SUPI.

As specified in 3GPP TS 29.503 V15.3.0:
Type: AccessAndMobilitySubscriptionData

TABLE 6.1.6.2.4-1

| Definition of type AccessAndMobilitySubscriptionData | | | | |
|---|---|---|---|---|
| Attribute name | Data type | P | Cardinality | Description |
| supportedFeatures | SupportedFeatures | O | 0 . . . 1 | See subclause 6.1.8 |
| gpsis | array(Gpsi) | O | 0 . . . N | List of Generic Public Subscription Identifier; see 3GPP TS 29.571 [7] |
| internalGroupIds | array(GroupId) | O | 1 . . . N | List of internal group identifier; see 3GPP TS 23.501 [2] subclause 5.9.7 |

. . . skipped the rest for clarity . . .

The UE may acquire the following configuration information from the Session Management Function (SMF) during the lifetime of a Protocol Data Unit (PDU) Session:
   address(es) of the Proxy Call Session Control Function (s) (P-CSCF(s));
   address(es) of Domain Name System (DNS) server(s); and
   the GPSI of the UE.

SUMMARY

There currently exist certain challenge(s). The Access and Mobility Management Function (AMF) only knows, for a given SUPI for a UE, a list of GPSI(s). This is insufficient, e.g., to support Lawful Interception (LI), as specified in 3GPP TS 33.127 V15.1.0, subclause 6.2.2.2, as below:

---

6.2.2.2 Target identities

The LIPF present in the ADMF provisions the intercept information associated with the following target identities to the IRI-POI present in the AMF:
   - SUPI.
   - PEI.
   - GPSI.
The interception performed on the above three identities are mutually independent, even though, an xIRI may contain the information about the other identities when available.

---

In the case when a UE has multiple GPSIs, a PDU session activated by UE may be linked to only one of GPSI. This means that only the signaling and/or user plane traffic applicable to this GPSI, i.e. the PDU session linked to this GPSI, shall be intercepted, but NOT others.

The AMF is to know, for a given PDU session(s) from a UE (identified by a SUPI), which GPSI is associated with which PDU session(s).

Certain aspects of the present disclosure and their embodiments may provide solutions to the aforementioned or other challenges. In some embodiments, a mechanism is provided in 5GC to provision a GPSI, applicable to certain PDU session, from the (Home) Session Management Function (SMF) ((h)SMF) to the (v-SMF) and/or AMF, via SMContextCreatedData and/or PduSessionCreatedData.

There are, proposed herein, various embodiments which address one or more of the issues disclosed herein. As depicted in FIGS. 4, 5, and 6 and described below, in some embodiments, the present disclosure provides a method performed by a Network Function (NF) (e.g., SMF, e.g. a SMF in the Home PLMN, i.e. a H-SMF) comprising receiving (WT300, XX100, XX200) a request from a NF service consumer, the request being related to a PDU session and then sending (WT302, XX102A, XX202A) a response to the NF services consumer, the response comprising a GPSI of the PDU session. In at least one embodiment, such as shown in FIG. 5, the method comprises an SMF receiving (XX100) a request from the NF service consumer requesting creation of an SM context. If the SM context is successfully created, the method continues by sending (XX102A) a message from the SMF to the NF service consumer that the SM context was created. Alternatively, if an error in creating the SM context occurs, the method continues by sending (XX102B) an error message from the SMF to the NF service consumer. Note that for an existing PDU session, e.g. PDU session moved from another access or another system, if a GPSI is associated with the PDU session, the SMF includes the associated GPSI in the response body (in step XX102A). For example, a PDU session considered as existing may be moved from EPS to 5GS. Also, for an existing HR PDU session, if the GPSI associated with the PDU session is received from H-SMF in PDU Session Create response, the SMF includes it in the response body.

In at least one other embodiment, such as shown in FIG. 6, the method comprises an H-SMF receiving (XX200) a request from the NF service consumer requesting creation of a PDU session. If the PDU session is successfully created, the method continues by sending (XX202A) a message from the H-SMF to the NF service consumer that the PDU session was created. Alternatively, if an error in creating the PDU session occurs, the method continues by sending (XX202B) an error message from the H-SMF to the NF service consumer. Note that for an existing PDU session, e.g. PDU session moved from another access or another system, if a GPSI is associated with the PDU session, the SMF includes it in the response body.

A particular embodiment is directed to a method by an Access and Mobility Management Function (AMF) node operative in a Fifth Generation System (5GS) that comprises a User Equipment (UE) associated with a Subscriber Permanent Identifier (SUPI) that is associated with subscription data of the UE. The method comprises: sending towards a Session Management Function (SMF) node, a request relating to a Protocol Data Unit (PDU) Session of the UE and comprising a Request Type that is set to Existing PDU Session; and receiving from the SMF node, a response comprising a Generic Public Subscription Identifier (GPSI) of the PDU session, which GPSI is associated with the SUPI and which GPSI is to be used in networks outside the 5GS for addressing the subscription data of the UE.

Another particular embodiment is directed to a method by a Session Management Function (SMF) node operative in a Fifth Generation System (5GS) that comprises a User Equipment (UE) associated with a Subscriber Permanent Identifier (SUPI) that is associated with subscription data of the UE. The method comprises: receiving from an Access and Mobility Management Function (AMF) node, a request relating to a Protocol Data Unit (PDU) Session of the UE and comprising a Request Type that is set to Existing PDU Session; and sending towards the AMF node, a response comprising a Generic Public Subscription Identifier (GPSI) of the PDU session, which GPSI is associated with the SUPI and which GPSI is to be used in networks outside the 5GS for addressing the subscription data of the UE.

Another particular embodiment is directed to a network node implementing an Access and Mobility Management Function (AMF) node configured to be operative in a Fifth Generation System (5GS) that comprises a User Equipment (UE) associated with a Subscriber Permanent Identifier (SUPI) that is associated with subscription data of the UE. The AMF node comprises: a network interface; and processing circuitry associated with the network interface. The processing circuitry is configured to cause the network node to implement the AMF node, the AMF node adapted to: send towards a Session Management Function (SMF) node, a request relating to a Protocol Data Unit (PDU) Session of the UE and comprising a Request Type that is set to Existing PDU Session; and receive from the SMF node, a response comprising a Generic Public Subscription Identifier (GPSI) of the PDU session, which GPSI is associated with the SUPI and which GPSI is to be used in networks outside the 5GS for addressing the subscription data of the UE.

Another particular embodiment is directed to a network node implementing a Session Management Function (SMF) node configured to be operative in a Fifth Generation System (5GS) that comprises a User Equipment (UE) associated with a Subscriber Permanent Identifier (SUPI) that is associated with subscription data of the UE. The network node comprises: a network interface; and processing circuitry associated with the network interface. The processing circuitry is configured to cause the network node to implement the SMF node, the SMF node adapted to: receive from an Access and Mobility Management Function (AMF) node, a request relating to a Protocol Data Unit (PDU) Session of the UE and comprising a Request Type that is set to Existing PDU Session; and send to the AMF node, a response comprising a GPSI of the existing PDU session, which GPSI is associated with the SUPI and which GPSI is to be used in networks outside the 5GS for addressing the subscription data of the UE.

Certain embodiments may provide one or more of the following technical advantage(s). The disclosure enables the AMF to know the exact GPSI, among a list of GPSIs for a UE (identified by a SUPI), to be associated with a PDU session.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
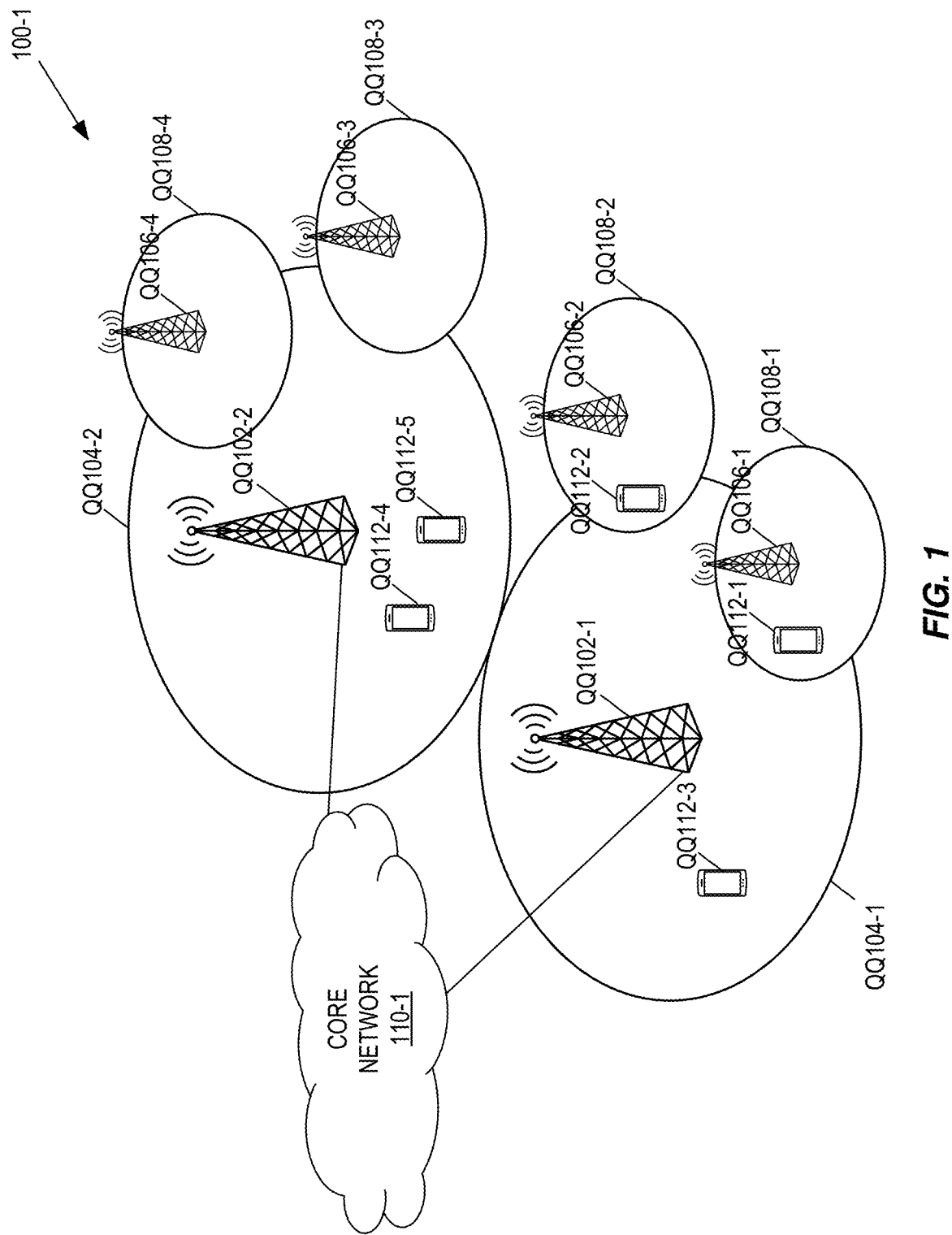
FIG. 1 illustrates one example of a cellular communications network 100-1 according to some embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1

FIG. 1 illustrates one example of a cellular communications network 100-1 according to some embodiments of the present disclosure. In the embodiments described herein, the cellular communications network 100-1 is a 5G NR network. In this example, the cellular communications network 100-1 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100-1 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110-1.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

FIG. 2a

Figure 2A:
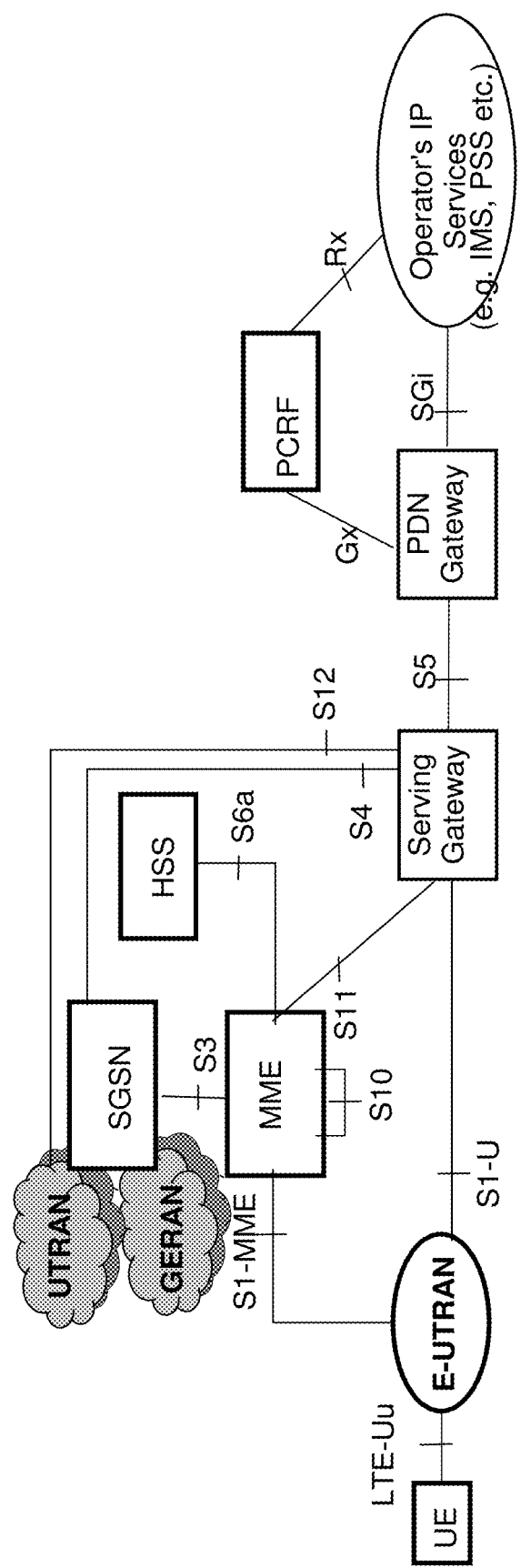
FIG. 2 a illustrates a wireless communication system represented as an exemplifying Evolved Packet System (EPS) architecture comprising a Radio Access Network (RAN) in the form of an Evolved Universal Terrestrial Radio Access Network (E-UTRAN) and a core network in the form of a Evolved Packet Core (EPC)
FIG. 2b illustrates a wireless communication system 100-2 represented as a Fifth Generation (5G) System (5GS) architecture.

FIG. 2a illustrates a wireless communication system represented as an exemplifying Evolved Packet System (EPS) architecture comprising a RAN in the form of an Evolved Universal Terrestrial Radio Access Network (E-UTRAN) and a core network in the form of a Evolved Packet Core (EPC). The EPC comprises core network nodes such as the Mobility Management Entity (MME), Home Subscriber Server (HSS), Serving Gateway (SGW), PDN Gateway (PGW) and Policy and Charging Rules Function (PCRF).

FIG. 2b

Figure 2B:
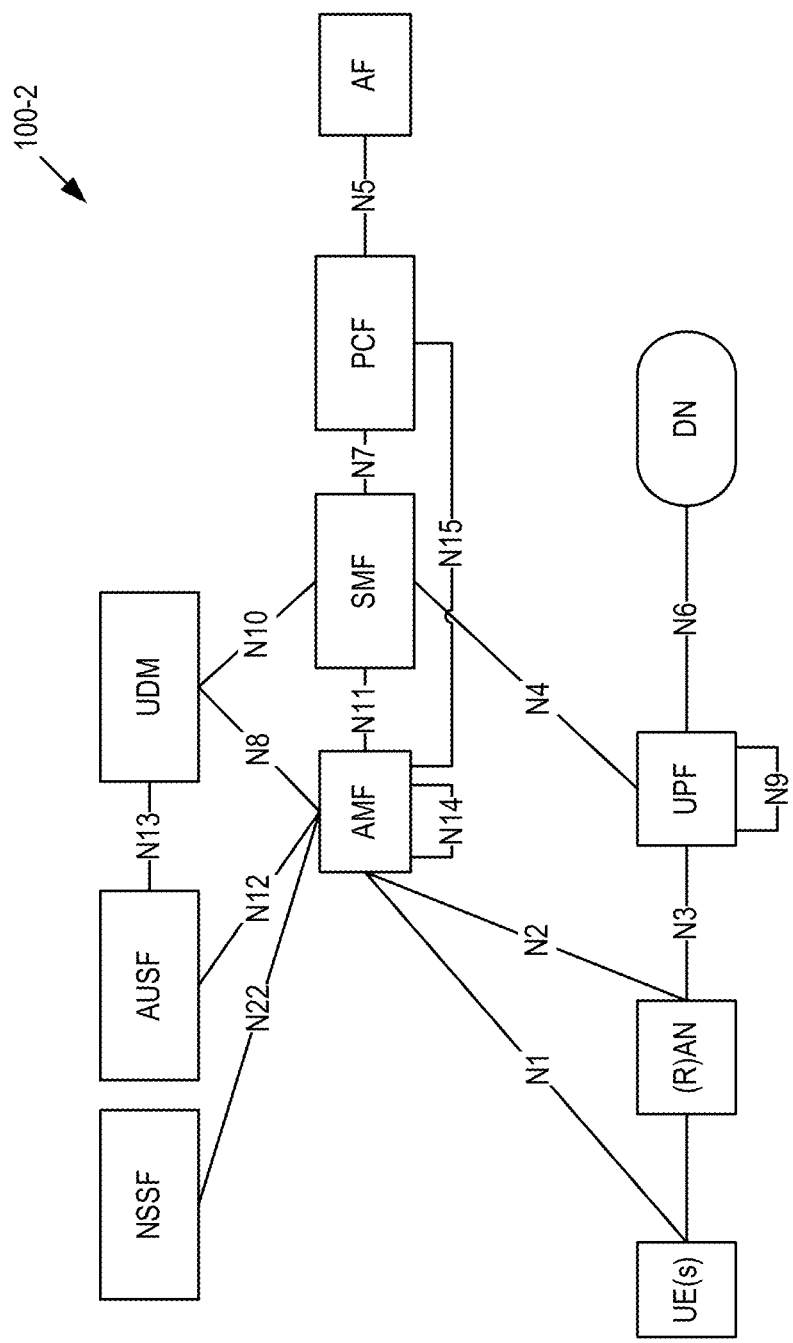

FIG. 2b illustrates a wireless communication system 100-2 represented as a 5G System architecture composed of core Network Functions (NFs), where interaction between any two NFs is represented by a point-to-point reference point/interface. FIG. 2b can be viewed as one particular implementation of the system 100-1 of FIG. 1.

Seen from the access side the 5G network architecture shown in FIG. 2b comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 2b include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2b, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2b. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

FIG. 3

Figure 3:
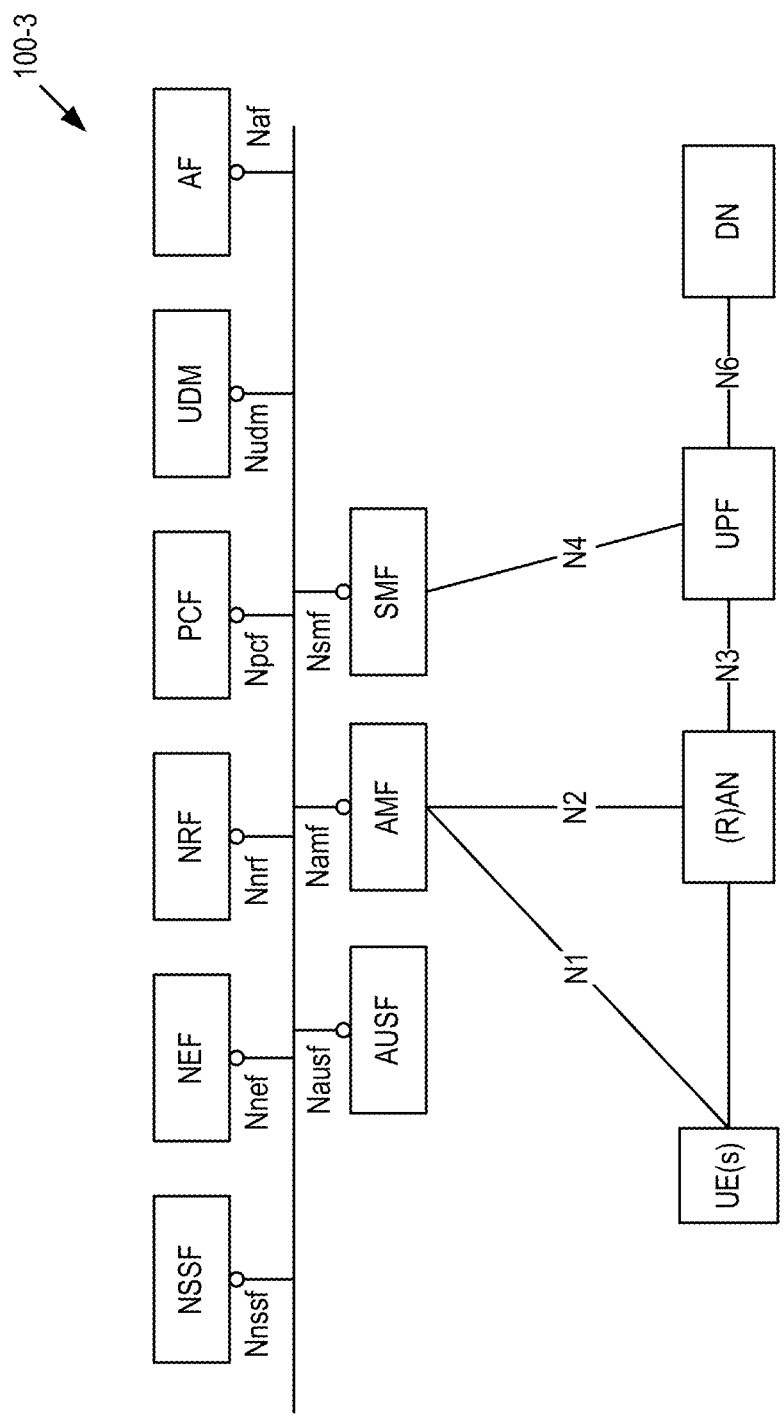
FIG. 3 illustrates a 5G System architecture 100-3 using service-based interfaces.

FIG. 3 illustrates a 5G System architecture 100-3 using service-based interfaces between the NFs in the control plane, instead of the point-to-point reference points/interfaces used in the 5G System architecture of FIG. 2b. However, the NFs described above with reference to FIG. 2b correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF etc. The Network Exposure Function (NEF) and the Network Repository Function (NRF) in FIG. 3 are not shown in FIG. 2b discussed above. However, it should be clarified that all NFs depicted in FIG. 2b can interact with the NEF and the NRF of FIG. 1 as necessary, though not explicitly indicated in FIG. 2b.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

Figure 4:
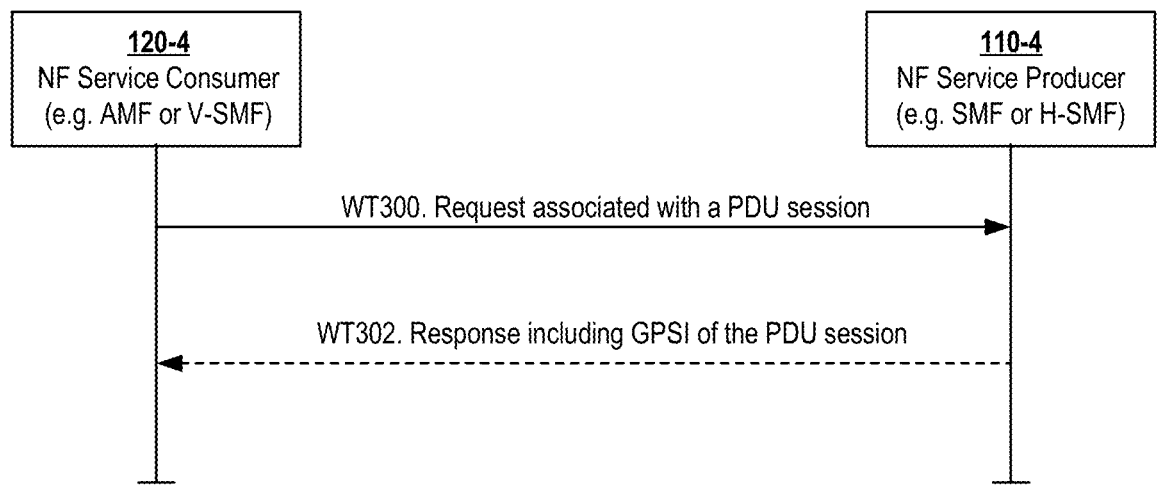
FIG. 4 illustrates the operation of a NF service producer and a NF service consumer in accordance with some embodiment of the present disclosure.

An NF may be implemented either as a network element on a dedicated hardware, as a software instance running on a dedicated hardware, or as a virtualized function instantiated on an appropriate platform, e.g., a cloud infrastructure. FIG. 4

FIG. 4 illustrates the operation of a NF service producer 110-4 (e.g., a SMF or H-SMF) and a NF service consumer (i.e., a NF that consumes a service of the NF service producer) in accordance with some embodiment of the present disclosure. In the preferred embodiments described herein, the NF service producer is either a SMF or a H-SMF. As illustrated, the NF service consumer sends a request to the NF service producer, where the request is associated with a PDU session (e.g., is a request to create a SM context for the PDU session or a request to create the PDU session) (step WT300). The NF service producer sends a response to the NF service consumer, where the response includes a GPSI of the PDU session (step WT302). As discussed below, in some embodiments, there are some conditions under which the response WT302 may include a GPSI of the PDU session (i.e., a GPSI mapped to or otherwise linked to the PDU session) and some other conditions under which the response in WT302 may not include a GPSI of the PDU session.

Figure 5:
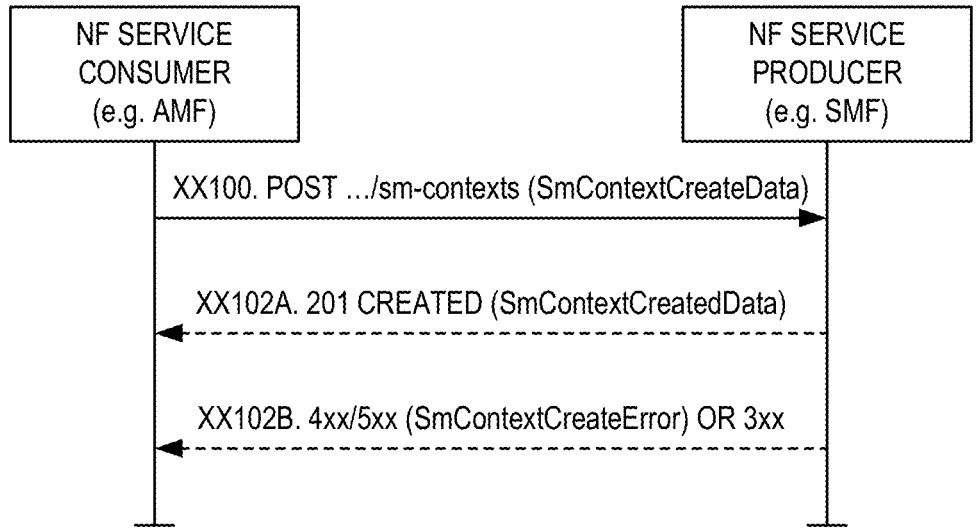
FIG. 5 discloses a method to create an SM context by using the HTTP POST method.
Figure 6:
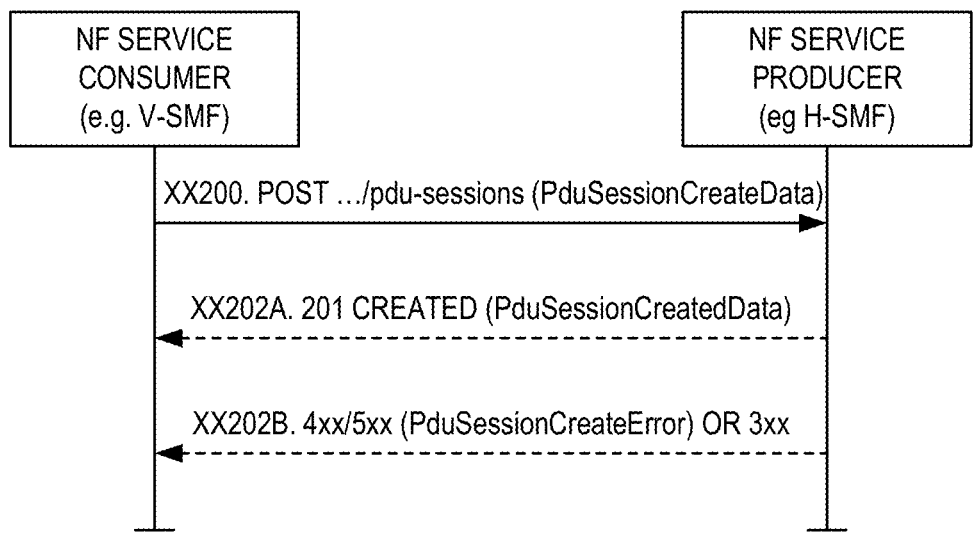
FIG. 6 illustrates a procedure for creating a PDU session.

FIGS. 5 and 6 provide two example implementations of the process of FIG. 4.

FIG. 5

FIG. 5 illustrates a procedure for creating a SM context for a PDU session in which the SMF provides the GPSI of the PDU session to the NF service consumer. In General, the Create SM Context service operation is used to create an individual SM context, for a given PDU session, in the SMF, or in the V-SMF for HR roaming scenarios.

The Create SM Context service is used in the following procedures:
  UE requested PDU Session Establishment (see subclause 4.3.2 of 3GPP TS 23.502 [3]);
  EPS to 5GS Idle mode mobility or handover using N26 interface (see subclause 4.11.1 of 3GPP TS 23.502 [3]);
  EPS to 5GS mobility without N26 interface (see subclause 4.11.2.3 3GPP TS 23.502 [3]) (when an existing Packet Data Network (PDN) connection is moved from EPS to 5GS the existing PDN connection can be perceived as an existing PDU session by the AMF, which uses PDU terminology and not PDN terminology);
  Handover of a PDU session between 3GPP access and non-3GPP access, when the target AMF does not know the SMF resource identifier of the SM context used by the source AMF, e.g. when the target AMF is not in the PLMN of the N3IWF (see subclause 4.9.2.3.2 of 3GPP TS 23.502 [3]), or when the UE is roaming and the selected N3IWF is in the HPLMN (see subclause 4.9.2.4.2 of 3GPP TS 23.502 [3]);
  Handover from EPS to 5GC-N3IWF (see subclause 4.11.3.1 of 3GPP TS 23.502 [3]);
  Handover from EPC/ePDG to 5GS (see subclause 4.11.4.1 of 3GPP TS 23.502 [3]).

There shall be only one individual SM context per PDU session.

FIG. 5 described in greater detail here discloses a method to create an SM context by using the HTTP POST method. The steps of FIG. 5 are as follows:

Step XX100: The NF Service Consumer shall send a POST request to the resource representing the SM contexts collection resource of the SMF. The payload body of the POST request shall contain:
  a representation of the individual SM context resource to be created;
  the Request Type IE, if it is received from the UE and if the request refers to an existing PDU session or an existing Emergency PDU session; the Request Type IE may be included in the POST request and thus set to Existing PDU Session or set to Existing Emergency PDU Session respectively, otherwise;
  the Old PDU Session ID, if it is received from the UE (i.e. for a PDU session establishment for the SSC mode 3 operation);
  the indication that the UE is inside or outside of the LADN (Local Area Data Network) service area, if the DNN corresponds to a LADN;
  a subscription for SM context status notification;
  the servingNfId identifying the serving AMF;
  trace control and configuration parameters, if trace is to be activated (see 3GPP TS 32.422 [22]).

For the UE requested PDU Session Establishment procedure in home routed roaming scenario (see subclause 4.3.2.2.2 of 3GPP TS 23.502 [3]), the NF Service Consumer shall provide the URI of the Nsmf_PDUSession service of the H-SMF in the hSmfUri IE and may provide the URI of the Nsmf_PDUSession service of additional H-SMFs. The V-SMF shall try to create the PDU session using the hSmfUri IE. If due to communication failure on the N16 interface the V-SMF does not receive any response from the H-SMF, then:
  depending on operator policy, the V-SMF may try reaching the hSmfUri via an alternate path; or
  if additional H-SMF URI is provided, the V-SMF may try to create the PDU session on one of the additional H-SMF(s) provided.

The payload body of the POST request may further contain:
  the name of the AMF service to which SM context status notification are to be sent (see subclause 6.5.2.2 of 3GPP TS 29.500 [4]), encoded in the serviceName attribute.

Step XX102A: On success, "201 Created" shall be returned, the payload body of the POST response shall contain the representation describing the status of the request and the "Location" header shall be present and shall contain the URI of the created resource. The authority and/or deployment-specific string of the apiRoot of the created resource URI may differ from the authority and/or deployment-specific string of the apiRoot of the request URI received in the POST request.

If the Request Type was received in the request and set to EXISTING_PDU_SESSION or EXISTING_EMERGENCY_PDU_SESSION (e.g. indicating that this is a request for an existing PDU session or an existing emergency PDU session), the SMF shall identify the existing PDU session or emergency PDU session based on the PDU Session ID; in this case, the SMF shall not create a new SM context but instead update the existing SM context and provide the representation of the updated SM context in the "201 Created" response to the NF Service Consumer.

The POST request shall be considered as colliding with an existing SM context if:
  it includes the same SUPI, or PEI for an emergency registered UE without a UICC or without an authenticated SUPI, and the same PDU Session ID as for an existing SM context; and
  this is a request to establish a new PDU session, i.e. the RequestType is absent in the request or is present and set to INITIAL_REQUEST or INITIAL_EMERGENCY_REQUEST.

A POST request that collides with an existing SM context shall be treated as a request for a new SM context. Before creating the new SM context, the SMF should delete the existing SM context locally and any associated resources in the UPF and PCF. If the smContextStatusUri of the existing SM context differs from the smContextStatusUri received in the POST request, the SMF shall also send an SM context status notification (see subclause 5.2.2.5) targeting the smContextStatusUri of the existing SM context to notify the release of the existing SM context. For a HR PDU session, if the H-SMF URI in the request is different from the H-SMF URI of the existing PDU session, the V-SMF should also delete the existing PDU session in the H-SMF by invoking the Release service operation (see subclause 5.2.2.9).

If the Request Type was received in the request and indicates this is a request for a new PDU session (i.e. INITIAL_REQUEST) and if the Old PDU Session ID was also included in the request, the SMF shall identify the existing PDU session to release and to which the new PDU session establishment relates, based on the Old PDU Session ID.

For an existing PDU session, e.g. PDU session moved from another access or another system, if a GPSI is associated with the PDU session, the SMF shall include the associated GPSI in the response body; For an existing HR PDU session, if the GPSI associated with the PDU session is received from H-SMF in PDU Session Create response, the SMF shall include it in the response body.

Step XX102B: If the request does not include the "UE presence in LADN service area" indication and the SMF determines that the DNN corresponds to a LADN, then the SMF shall consider that the UE is outside of the LADN service area. The SMF shall reject the request if the UE is outside of the LADN service area.

On failure, or redirection during a UE requested PDU Session Establishment, one of the HTTP status code listed in Table 6.1.3.2.3.1-3 shall be returned. For a 4xx/5xx response, the message body shall contain an SmContextCreateError structure, including:
  a ProblemDetails structure with the "cause" attribute set to one of the application error listed in Table 6.1.3.2.3.1-3;
  N1 SM information (PDU Session Reject), if the request included N1 SM information, except if the error prevents the SMF from generating a response to the UE (e.g. invalid request format).

FIG. 6

FIG. 6 illustrates a procedure for creating a PDU session in which the H-SMF provides the GPSI of the PDU session to the NF service consumer. In general, the Create service operation shall be used to create an individual PDU session in the H-SMF for HR roaming scenarios. The Create service operation is used in the following procedures:
  UE requested PDU Session Establishment (see subclause 4.3.2.2.2 of 3GPP TS 23.502 [3]); EPS to 5GS Idle mode mobility or handover using N26 interface (see subclause 4.11 of 3GPP TS 23.502 [3]);
  EPS to 5GS mobility without N26 interface (see subclause 4.11.2.3 3GPP TS 23.502 [3] (when an existing PDN connection is moved from EPS to 5GS the existing PDN connection can be perceived as an existing PDU session by the AMF, which uses PDU terminology and not PDN terminology);
  Handover of a PDU session between 3GPP access and non-3GPP access, when the target AMF does not know the SMF resource identifier of the SM context used by the source AMF, e.g. when the target AMF is not in the PLMN of the N3IWF (see subclause 4.9.2.3.2 of 3GPP TS 23.502 [3]);
  Handover from EPS to 5GC-N3IWF (see subclause 4.11.3.1 of 3GPP TS 23.502 [3]);
  Handover from EPC/ePDG to 5GS (see subclause 4.11.4.1 of 3GPP TS 23.502 [3]).

FIG. 6 described in greater detail here discloses a method for the NF service consumer (e.g. V-SMF) to create a PDU session by using the HTTP POST method. As illustrated, the steps of FIG. 6 are as follows.

Step XX200: The NF Service Consumer shall send a POST request to the resource representing the PDU sessions collection resource of the H-SMF. The payload body of the POST request shall contain:
  a representation of the individual PDU session resource to be created;
  the Request Type IE, if it is received from the UE and if the request refers to an existing PDU session or an existing Emergency PDU session; the Request Type may be included in the POST request and thus set to Existing PDU Session or set to Existing Emergency PDU Session respectively, otherwise;
  the vsmfId IE identifying the serving SMF;
  the vcnTunnelInfo;
  the anType;
  a URI ({vsmfPduSessionUri}) representing the PDU session resource in the V-SMF, for possible use by the H-SMF to subsequently modify or release the PDU session.

As specified in subclause 4.3.2.2.2 of 3GPP TS 23.502 [3], the NF Service Consumer shall be able to receive an Update request before receiving the Create Response, e.g. for EPS bearer ID allocation (see subclause 4.11.1.4.1 of 3GPP TS 23.502 [3]) or Secondary authorization/authentication (see subclause 4.3.2.3 of 3GPP TS 23.502 [3]).

Step XX202A: On success, "201 Created" shall be returned, the payload body of the POST response shall contain:
  the representation describing the status of the request;
  the QoS flow(s) to establish for the PDU session;
  the epsPdnCnxInfo IE and, for each EPS bearer, an epsBearerinfo IE, if the PDU session may be moved to EPS during its lifetime;
  the "Location" header containing the URI of the created resource.

The authority and/or deployment-specific string of the apiRoot of the created resource URI may differ from the authority and/or deployment-specific string of the apiRoot of the request URI received in the POST request.

If an Update Request was sent to the V-SMF before the Create Response, the URI in the "Location" header and in the hsmfPduSessionUri IE of the H-SMF initiated Update Request shall be the same. If the Request Type was received in the request and set to EXISTING_PDU_SESSION or EXISTING_EMERGENCY_PDU_SESSION (e.g. indicating that this is a request for an existing PDU session or an existing emergency PDU session), the SMF shall identify the existing PDU session or emergency PDU session based on the PDU Session ID; in this case, the SMF shall not create a new PDU session or emergency PDU session but instead update the existing PDU session or emergency PDU session and provide the representation of the updated PDU session or emergency PDU session in the response to the NF Service Consumer.

The POST request shall be considered as colliding with an existing PDU session context if:
  it includes the same SUPI, or PEI for an emergency registered UE without a UICC or without an authenticated SUPI, and the same PDU Session ID as for an existing PDU session context; and
  this is a request to establish a new PDU session, i.e. the RequestType is absent in the request or is present and set to INITIAL_REQUEST or INITIAL_EMERGENCY_REQUEST.

A POST request that collides with an existing PDU session context shall be treated as a request for a new PDU session context. Before creating the new PDU session context, the SMF should delete the existing PDU session context locally and any associated resources in the UPF and PCF. If the vsmfPduSessionUri of the existing PDU session context differs from the vsmfPduSessionUri received in the POST request, the SMF shall also send a status notification (see subclause 5.2.2.10) targeting the vsmfPduSessionUri of the existing PDU session context to notify the release of the existing PDU session context.

If the Request Type was received in the request and indicates this is a request for a new PDU session (i.e. INITIAL_REQUEST) and if the Old PDU Session ID was also included in the request, the SMF shall identify the existing PDU session to be released and to which the new PDU session establishment relates, based on the Old PDU Session ID.

The NF Service Consumer shall store any epsPdnCnxInfo and EPS bearer information received from the H-SMF.

If the response received from the H-SMF contains the alwaysOnGranted attribute set to true, the V-SMF shall check and determine whether the PDU session can be established as an always-on PDU session based on local policy.

For existing PDU session, e.g. PDU session moved from another access or another system, if a GPSI is associated with the PDU session, the SMF shall included it in the response body.

Step XX202B: On failure, or redirection during a UE requested PDU Session Establishment, one of the HTTP status code listed in Table 6.1.3.5.3.1-3 shall be returned. For a 4xx/5xx response, the message body shall contain a PduSessionCreateError structure, including:
  a ProblemDetails structure with the "cause" attribute set to one of the application error listed in Table 6.1.3.5.3.1-3;
  the n1SmCause IE with the SGSM cause that the H-SMF proposes the V-SMF to return to the UE, if the request included n1SmInfoFromUe;
  n1SmInfoToUe with any information to be sent to the UE (in the PDU Session Establishment Reject).

Additional information is found in the document(s) provided in the Appendix. The information provided includes an additional description of the GPSI for context of the present disclosure.

FIG. 7

Figure 7:
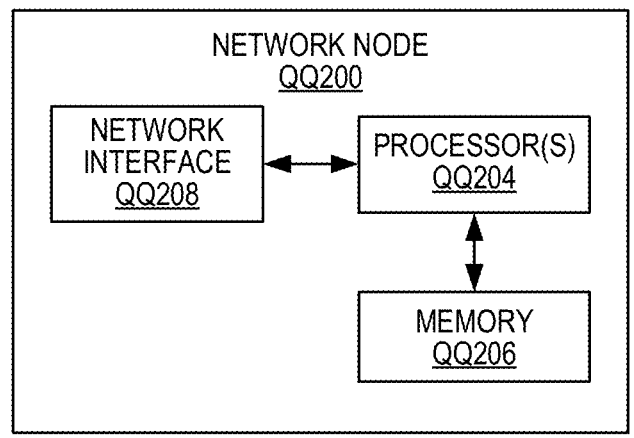
FIG. 7 is a schematic block diagram of a network node according to some embodiments of the present disclosure.

FIG. 7 is a schematic block diagram of a network node QQ200 according to some embodiments of the present disclosure. The network node QQ200 may be, for example, a NF in the core network QQ110-1 or a network node implementing a NF in the core network QQ110. As illustrated, the network node QQ200 includes one or more processors QQ204 (e.g., Central Processing Units (CPUs), Application Specific Integrated Circuits (ASICs), Field Programmable Gate Arrays (FPGAs), and/or the like), memory QQ206, and a network interface QQ208. The one or more processors QQ204 are also referred to herein as processing circuitry. The one or more processors QQ204 operate to provide one or more functions of a network node QQ200 (e.g., one or more functions of a NF service consumer QQ210 e.g. such as an AMF or a V-SMF, or a NF service producer QQ220 e.g. such as a SMF, or a H-SMF) as described herein. In some embodiments, the function(s) are implemented in software that is stored, e.g., in the memory QQ206 and executed by the one or more processors QQ204.

FIG. 8

Figure 8:
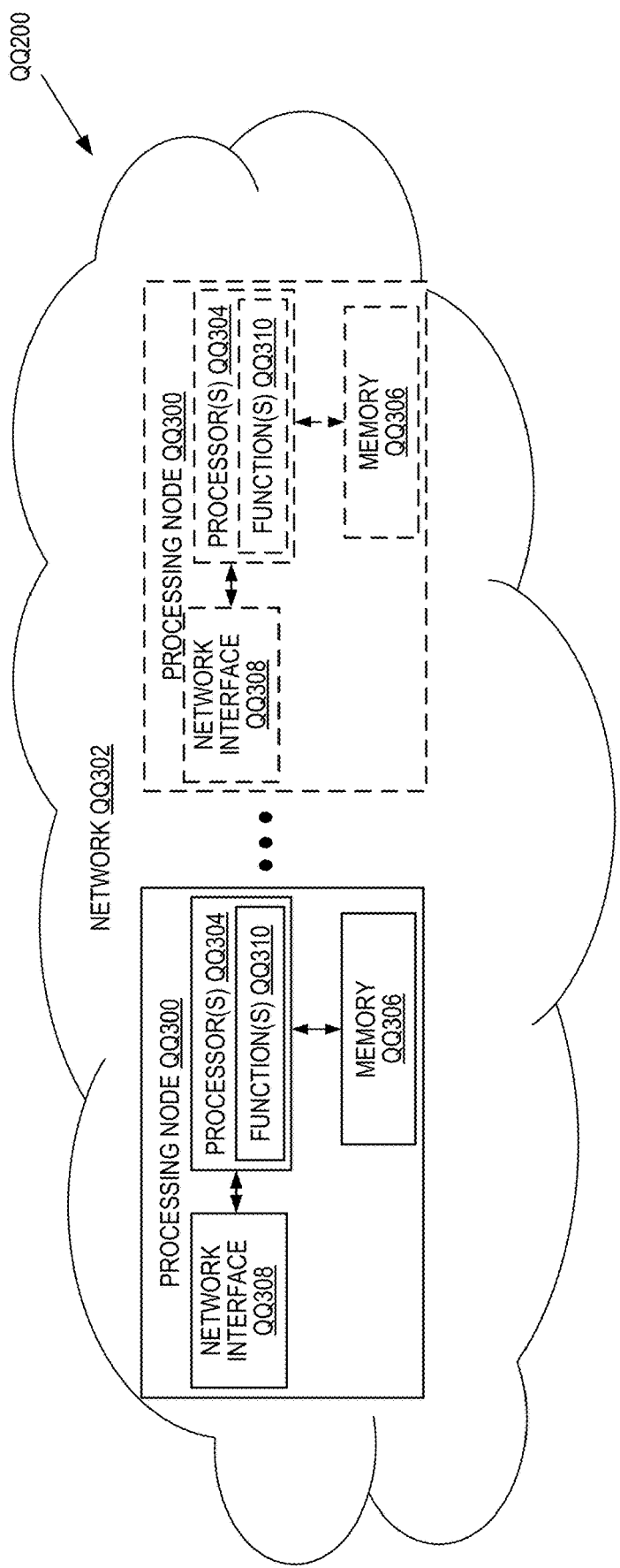
FIG. 8 a schematic block diagram that illustrates a virtualized embodiment of the network node according to some embodiments of the present disclosure.

FIG. 8 is a schematic block diagram that illustrates a virtualized embodiment of the network node QQ200 according to some embodiments of the present disclosure. A used herein, a "virtualized" network node is an implementation of the network node QQ200 in which at least a portion of the functionality of the network node QQ200 is implemented as a virtual component(s) (e.g., via a virtual machine(s) executing on a physical processing node(s) in a network(s)). As illustrated, in this example, the network node QQ200 includes one or more processors QQ304 (e.g., CPUs, ASICs, FPGAs, and/or the like), memory QQ306, and a network interface QQ308. In this example, functions QQ310 of the network node QQ200 (e.g., one or more functions of a NF service consumer, a NF service producer, a SMF, or a H-SMF) described herein are implemented at the one or more processing nodes QQ300. In some particular embodiments, some or all of the functions QQ310 of the network node QQ200 (e.g., one or more functions of a NF service consumer, a NF service producer, a SMF, or a H-SMF) described herein are implemented as virtual components executed by one or more virtual machines implemented in a virtual environment(s) hosted by the processing node(s) QQ300.

In some embodiments, a computer program including instructions which, when executed by at least one processor, causes the at least one processor to carry out the functionality of the network node QQ200 or a node (e.g., a processing node QQ300) implementing one or more of the functions QQ310 of the network node QQ200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 9

Figure 9:
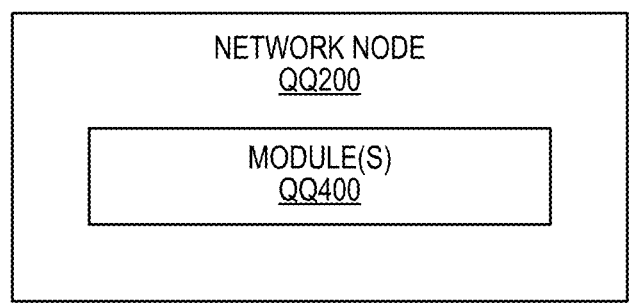
FIG. 9 is a schematic block diagram of the network node QQ200 according to some other embodiments of the present disclosure.

FIG. 9 is a schematic block diagram of the network node QQ200 according to some other embodiments of the present disclosure. The network node QQ200 includes one or more modules QQ400, each of which is implemented in software. The module(s) QQ400 provide the functionality of the network node QQ200 (e.g., one or more functions of a NF service consumer QQ210 such as e.g. an AMF or a V-SMF, or a NF service producer QQ220 such as e.g. a SMF, or a H-SMF) described herein. This discussion is equally applicable to the processing node QQ300 of Figure QQ3 where the modules QQ400 may be implemented at one of the processing nodes QQ300 or distributed across multiple processing nodes QQ300 and/or distributed across the processing node(s) QQ300 and the control system QQ202.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some embodiments described above may be summarized in the following manner:

1. A method performed by a network function (NF) service consumer, the method comprising:
   sending (WT300, XX100, XX200), for a SMF or H-SMF, a request related to a PDU session; and
   receiving (WT302, XX102A, XX202A), from the SMF or H-SMF, a response comprising a GPSI of the PDU session.

2. The method of embodiment 1 further comprising receiving (XX102B, XX202B) an error message if the request is not granted.

3. The method of embodiment 1 wherein the request is a request to create an SM context for the PDU session.

4. The method of embodiment 1 wherein the request is a request to create the PDU session.

5. The method of embodiments 3 and 4 wherein if the GPSI is associated with the PDU session, the GPSI is included a body of the response.

6. A method performed by a SMF or H-SMF, the method comprising:
   receiving (WT300, XX100, XX200), from a NF service consumer, a request related to a PDU session; and
   sending (WT302, XX102A, XX202A), to the NF service consumer, a response comprising a GPSI of the PDU session.

7. The method of embodiment 6 further comprising sending (XX102B, XX202B) an error message if the request is not granted.

8. The method of embodiment 6 wherein the request is a request to create an SM context.

9. The method of embodiment 6 wherein the request is a request to create a PDU session.

10. The method of embodiment 6, 8, or 9 wherein, if a GPSI is associated with the PDU session, the GPSI is in a body of the response.

11. A NF service consumer adapted to perform the method of any one of embodiments 1 to 5.

12. A network node for implementing a NF service consumer, the network node comprising:
   a network interface; and
   processing circuitry associated with the network interface, the processing circuitry configured to cause the network node to implement the NF service consumer, the NF service consumer adapted to perform the method of any one of embodiments 1 to 5.

13. A SMF or H-SMF adapted to perform the method of any one of embodiments 6 to 10.

14. A network node for implementing a SMF or H-SMF, the network node comprising:
   a network interface; and
   processing circuitry associated with the network interface, the processing circuitry configured to cause the network node to implement the SMF or H-SMF, the SMF or H-SMF adapted to perform the method of any one of embodiments 6 to 10.

Some further embodiments described above may be summarized in the following manner:

1. A method by an Access and Mobility Management Function, AMF, node, (120-4) operative in a Fifth Generation System, 5GS, (100-1, 100-2, 100-3) that comprises a User Equipment, UE, (112) associated with a Subscriber Permanent Identifier, SUPI, that is associated with subscription data of the UE, the method comprises:
   sending (WT300, XX100, XX200) towards a Session Management Function, SMF, node (110-4), a request relating to a Protocol Data Unit, PDU, Session of the UE and comprising a Request Type that is set to Existing PDU Session; and
   receiving (WT302, XX102A, XX202A), from the SMF node, a response comprising a Generic Public Subscription Identifier, GPSI, of the PDU session, which GPSI is associated with the SUPI and which GPSI is to be used in networks outside the 5GS for addressing the subscription data of the UE.

2. The method of embodiment 1 wherein the PDU session is moved from another system to the 5GS.

3. The method of embodiment 1 wherein the PDU session is moved from an Evolved Packet Core, EPS, system to the 5GS.

4. The method of any one of embodiment 1-3 wherein the request is a request to create an SM context for the existing PDU session.

5. The method of any one of embodiment 1-4 wherein if the GPSI is associated with the existing PDU session, the GPSI is included a body of the response.

6. A method by a Session Management Function, SMF, node (110-4) operative in a Fifth Generation System, 5GS, (100-1, 100-2, 100-3) that comprises a User Equipment, UE, (112) associated with a Subscriber Permanent Identifier, SUPI, that is associated with subscription data of the UE, the method comprises:
   receiving (WT300, XX100, XX200), from an Access and Mobility Management Function, AMF, node, (120-4), a request relating to a Protocol Data Unit, PDU, Session of the UE and comprising a Request Type that is set to Existing PDU Session; and
   sending (WT302, XX102A, XX202A), towards the AMF node, a response comprising a Generic Public Subscription Identifier, GPSI, of the PDU session, which GPSI is associated with the SUPI and which GPSI is to be used in networks outside the 5GS for addressing the subscription data of the UE.

7. The method of embodiment 6 wherein the PDU session is moved from another system to the 5GS.

8. The method of embodiment 6 wherein the PDU session is moved from an Evolved Packet Core, EPS, system to the 5GS.

9. The method of any one of embodiment 6-8 wherein the request is a request to create an SM context.

10. The method of any one of embodiment 6-9 wherein, if a GPSI is associated with the existing PDU session, the GPSI is in a body of the response.

11. A network node implementing an Access and Mobility Management Function, AMF, node (120-4) configured to be operative in a Fifth Generation System, 5GS, (100-1, 100-2, 100-39) that comprises a User Equipment, UE, (112) associated with a Subscriber Permanent Identifier, SUPI, that is associated with subscription data of the UE, the AMF node comprising:
   a network interface (QQ208, Namf); and
   processing circuitry (QQ204) associated with the network interface, the processing circuitry configured to cause the network node to implement the AMF node, the AMF node adapted to:
   send (WT300, XX100, XX200), towards a Session Management Function, SMF, node (110-4), a request relating to a Protocol Data Unit, PDU, Session of the UE and comprising a Request Type that is set to Existing PDU Session; and receive (WT302, XX102A, XX202A), from the SMF node, a response comprising a Generic Public Subscription Identifier, GPSI, of the PDU session, which GPSI is associated with the SUPI and which GPSI is to be used in networks outside the 5GS for addressing the subscription data of the UE.

12. A network node implementing a Session Management Function, SMF, node (110-4) configured to be operative in a Fifth Generation System, 5GS, (100-1, 100-2, 100-39) that comprises a User Equipment, UE, (112) associated with a Subscriber Permanent Identifier, SUPI, that is associated with subscription data of the UE, the network node comprising:

a network interface (QQ208, Nsmf); and processing circuitry (QQ204) associated with the network interface, the processing circuitry configured to cause the network node to implement the SMF node, the SMF node adapted to:

receive (WT300, XX100, XX200), from an Access and Mobility Management Function, AMF, node, (120-4), a request relating to a Protocol Data Unit, PDU, Session of the UE and comprising a Request Type that is set to Existing PDU Session; and send (WT302, XX102A, XX202A), to the AMF node, a response comprising a GPSI of the existing PDU session, which GPSI is associated with the SUPI and which GPSI is to be used in networks outside the 5GS for addressing the subscription data of the UE.

Abbreviations

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AF Application Function
AMF Access and Mobility Management Function
AN Access Network
AP Access Point
AUSF Authentication Server Function
BS Base Station
BSC Base Station Controller
BTS Base Transceiver Station
CDMA Code Division Multiple Access
CGI Cell Global Identifier
DL Downlink
DN Data Network
eNB Enhanced or Evolved Node B
E-UTRA Evolved Universal Terrestrial Radio Access
E-UTRAN Evolved Universal Terrestrial Radio Access Network
gNB New Radio Base Station
GPSI Generic Public Subscription Identifier
HO Handover
IP Internet Protocol
LAN Local Area Network
LTE Long Term Evolution
MAC Medium Access Control
MME Mobility Management Entity
MSC Mobile Switching Center
MTC Machine Type Communication
NEF Network Exposure Function
NF Network Function
NFV Network Function Virtualization
NR New Radio
NRF Network Repository Function
NSSF Network Slice Selection Function
PCF Policy Control Function
PDU Protocol Data Unit
P-GW Packet Data Network Gateway
PLMN Public Land Mobile Network
QoS Quality of Service
RAN Radio Access Network
RAT Radio Access Technology
RNC Radio Network Controller
SCEF Service Capability Exposure Function
S-GW Serving Gateway
SMF Session Management Function
TCP Transmission Control Protocol
UDM Unified Data Management
UE User Equipment
UL Uplink
UMTS Universal Mobile Telecommunications System
USIM Universal Subscriber Identity Module

The invention claimed is:

1. A method by an Access and Mobility Management Function, AMF, node, acting as a network function, NF, consumer operative in a Fifth Generation System, 5GS, that comprises a User Equipment, UE, associated with a Subscriber Permanent Identifier, SUPI, that is associated with subscription data of the UE, the method comprises:

sending towards a Session Management Function, SMF, node acting as a NF service producer, a request relating to a Protocol Data Unit, PDU, Session of the UE and comprising a Request Type that is set to Existing PDU Session; and receiving, from the SMF node, a response comprising a Generic Public Subscription Identifier, GPSI, associated with the PDU session of the UE, which UE is associated with the SUPI and which GPSI is an external identifier to be used in networks outside the 5GS for addressing the subscription data of the UE.

2. The method of claim 1 wherein the PDU session is moved from another system to the 5GS.

3. The method of claim 1 wherein the PDU session is moved from an Evolved Packet Core, EPS, system to the 5GS.

4. The method of claim 1 wherein the request is a request to create a Session Management, SM, context for the existing PDU session.

5. The method of claim 1 wherein if the GPSI is associated with the existing PDU session, the GPSI is included a body of the response.

6. A method by a Session Management Function, SMF, node acting as a Network Function, NF, service producer operative in a Fifth Generation System, 5GS, that comprises a User Equipment, UE, associated with a Subscriber Permanent Identifier, SUPI, that is associated with subscription data of the UE, the method comprises:

receiving, from an Access and Mobility Management Function, AMF, node acting as an NF consumer, a request relating to a Protocol Data Unit, PDU, Session of the UE and comprising a Request Type that is set to Existing PDU Session; and sending, towards the AMF node, a response comprising a Generic Public Subscription Identifier, GPSI, associated with the PDU session of the UE, which UE is associated with the SUPI and which GPSI is an external identifier to be used in networks outside the 5GS for addressing the subscription data of the UE.

7. The method of claim 6 wherein the PDU session is moved from another system to the 5GS.

8. The method of claim 6 wherein the PDU session is moved from an Evolved Packet Core, EPS, system to the 5GS.

9. The method of claim 6 wherein the request is a request to create a Session Management, SM, context.

10. The method of claim 6 wherein, if a GPSI is associated with the existing PDU session, the GPSI is in a body of the response.

11. A network node implementing an Access and Mobility Management Function, AMF, node acting as a network function, NF, consumer configured to be operative in a Fifth Generation System, 5GS, that comprises a User Equipment, UE, associated with a Subscriber Permanent Identifier, SUPI, that is associated with subscription data of the UE, the AMF node comprising:

a network interface; and processing circuitry associated with the network interface, the processing circuitry configured to cause the network node to implement the AMF node, the AMF node adapted to:

send, towards a Session Management Function, SMF, node, a request relating to a Protocol Data Unit, PDU, Session of the UE and comprising a Request Type that is set to Existing PDU Session; and receive, from the SMF node, a response comprising a Generic Public Subscription Identifier, GPSI, associated with the PDU session of the UE, which UE is associated with the SUPI and which GPSI an external identifier is to be used in networks outside the 5GS for addressing the subscription data of the UE.

12. A network node implementing a Session Management Function, SMF, node configured to act as a network function, NF, service producer operative in a Fifth Generation System, 5GS, that comprises a User Equipment, UE, associated with a Subscriber Permanent Identifier, SUPI, that is associated with subscription data of the UE, the network node comprising:

a network interface; and processing circuitry associated with the network interface, the processing circuitry configured to cause the network node to implement the SMF node, the SMF node adapted to:

receive, from an Access and Mobility Management Function, AMF, node acting as a NF consumer, a request relating to a Protocol Data Unit, PDU, Session of the UE and comprising a Request Type that is set to Existing PDU Session; and send, to the AMF node, a response comprising a Generic Public Subscription Identifier, GPSI, associated with the PDU session of the UE, which UE is associated with the SUPI and which GPSI is an external identifier to be used in networks outside the 5GS for addressing the subscription data of the UE.

* * * * *

UNITED STATES PATENT AND TRADEMARK OFFICE
CERTIFICATE OF CORRECTION

| | |
|---|---|
| PATENT NO. | : 11,877,351 B2 |
| APPLICATION NO. | : 17/946576 |
| DATED | : January 16, 2024 |
| INVENTOR(S) | : Yang et al. |

It is certified that error appears in the above-identified patent and that said Letters Patent is hereby corrected as shown below:

On the Title Page

In Item (57), under "ABSTRACT", in Column 2, Line 3, delete "Subscriber Permanent Identifier (SUPI)" and insert -- Subscription Permanent Identifier (SUPI) --, therefor.

In the Specification

In Column 2, Lines 19-20, delete "General Public Subscription Identifiers (GPSIs)" and insert -- Generic Public Subscription Identifiers (GPSIs) --, therefor.

In Column 4, Lines 31-32, delete "Subscriber Permanent Identifier (SUPI)" and insert -- Subscription Permanent Identifier (SUPI) --, therefor.

In Column 4, Lines 45-46, delete "Subscriber Permanent Identifier (SUPI)" and insert -- Subscription Permanent Identifier (SUPI) --, therefor.

In Column 4, Lines 60-61, delete "Subscriber Permanent Identifier (SUPI)" and insert -- Subscription Permanent Identifier (SUPI) --, therefor.

In Column 5, Line 10, delete "Subscriber Permanent Identifier (SUPI)" and insert -- Subscription Permanent Identifier (SUPI) --, therefor.

In Column 6, Line 31, delete "Access and Mobility Function (AMF)," and insert -- Access and Mobility Management Function (AMF), --, therefor.

In Column 6, Line 43, delete "User Equipment device (UE)" and insert -- User Equipment (UE) device --, therefor.

In Column 13, Line 54, delete "SGSM" and insert -- 5GSM --, therefor.

Signed and Sealed this
Twenty-third Day of April, 2024

Katherine Kelly Vidal
*Director of the United States Patent and Trademark Office*

CERTIFICATE OF CORRECTION (continued)
U.S. Pat. No. 11,877,351 B2

In Column 16, Line 19, delete "Evolved Packet Core, EPS," and insert -- Evolved Packet Core, EPC, --, therefor.

In Column 16, Line 47, delete "Evolved Packet Core, EPS," and insert -- Evolved Packet Core, EPC, --, therefor.

In the Claims

In Column 18, Line 46, in Claim 3, delete "Evolved Packet Core, EPS," and insert -- Evolved Packet Core, EPC, --, therefor.

In Column 19, Line 7, in Claim 8, delete "Evolved Packet Core, EPS," and insert -- Evolved Packet Core, EPC, --, therefor.